US010069307B2

(12) United States Patent
Takenaka

(10) Patent No.: US 10,069,307 B2
(45) Date of Patent: Sep. 4, 2018

(54) POWER CONVERSION DEVICE, POWER CONVERSION SYSTEM, AND POWER CONVERSION METHOD

(71) Applicant: KYOCERA Corporation, Kyoto-shi, Kyoto (JP)

(72) Inventor: Tetsuya Takenaka, Yamato (JP)

(73) Assignee: KYOCERA Corporation, Kyoto (JP)

(*) Notice: Subject to any disclaimer, the term of this patent is extended or adjusted under 35 U.S.C. 154(b) by 243 days.

(21) Appl. No.: 14/903,750

(22) PCT Filed: Jul. 7, 2014

(86) PCT No.: PCT/JP2014/068006
§ 371 (c)(1),
(2) Date: Jan. 8, 2016

(87) PCT Pub. No.: WO2015/005254
PCT Pub. Date: Jan. 15, 2015

(65) Prior Publication Data
US 2016/0156191 A1 Jun. 2, 2016

(30) Foreign Application Priority Data
Jul. 8, 2013 (JP) ................. 2013-142466

(51) Int. Cl.
H02J 3/38 (2006.01)
H02M 3/155 (2006.01)
(Continued)

(52) U.S. Cl.
CPC ............ *H02J 3/383* (2013.01); *B60L 11/1812* (2013.01); *H02J 7/007* (2013.01); *H02M 3/04* (2013.01);
(Continued)

(58) Field of Classification Search
CPC ....................................................... H02J 3/383
(Continued)

(56) References Cited

U.S. PATENT DOCUMENTS

2011/0140649 A1 6/2011 Choi
2011/0144822 A1 6/2011 Choi
(Continued)

FOREIGN PATENT DOCUMENTS

JP 2011-130656 A 6/2011
JP 2012-228043 A 11/2012
JP 2013-110870 A 6/2013

OTHER PUBLICATIONS

International Search Report dated Sep. 9, 2014 issued by Japanese Patent Office for International Application No. PCT/JP2014/068006.
(Continued)

*Primary Examiner* — Joseph Chang
(74) *Attorney, Agent, or Firm* — Procopio Cory Hargreaves and Savitch LLP

(57) ABSTRACT

A PCS (200) converts the output power from a plurality of distributed power supplies or the supply power to the distributed power supplies. The PCS (200) is provided with a plurality of converters for converting said output power or said supply power. In a first state, the converters convert the respective outputs of the distributed power supplies. In a second state, the converters perform a conversion on the output or input of at least one distributed power supply by using multiple converters.

9 Claims, 7 Drawing Sheets

(51) Int. Cl.
  *H02M 7/48* (2007.01)
  *H02J 7/00* (2006.01)
  *H02M 3/04* (2006.01)
  *H02M 7/44* (2006.01)
  *B60L 11/18* (2006.01)
  *H02M 1/00* (2006.01)
  *H02J 7/35* (2006.01)

(52) U.S. Cl.
  CPC ............. *H02M 3/155* (2013.01); *H02M 7/44* (2013.01); *H02M 7/48* (2013.01); *B60L 2210/10* (2013.01); *B60L 2230/22* (2013.01); *H02J 7/35* (2013.01); *H02M 2001/007* (2013.01); *Y02E 10/563* (2013.01); *Y02E 60/721* (2013.01); *Y02T 10/7005* (2013.01); *Y02T 10/7094* (2013.01); *Y02T 10/7216* (2013.01); *Y02T 10/92* (2013.01); *Y02T 90/12* (2013.01); *Y02T 90/127* (2013.01); *Y02T 90/14* (2013.01); *Y04S 10/126* (2013.01)

(58) Field of Classification Search
  USPC .......................................................... 307/82
  See application file for complete search history.

(56) References Cited

U.S. PATENT DOCUMENTS

| | | | |
|---|---|---|---|
| 2012/0043923 A1* | 2/2012 | Ikriannikov | H02J 1/10 320/103 |
| 2012/0049635 A1* | 3/2012 | Schelenz | G05F 1/67 307/82 |
| 2012/0274145 A1* | 11/2012 | Taddeo | H02J 1/12 307/82 |
| 2013/0113294 A1* | 5/2013 | Kaplan | H02J 3/36 307/82 |
| 2014/0042811 A1 | 2/2014 | Myamoto et al. | |
| 2014/0320083 A1 | 10/2014 | Masuda et al. | |

OTHER PUBLICATIONS

Written Opinion of International Search Authority dated Sep. 9, 2014 issued by Japanese Patent Office for International Application No. PCT/JP2014-068006.
Supplementary European Search Report dated Jan. 3, 2017 issued by the European Patent Office in counterpart European Patent Application No. 14822967.7.

* cited by examiner

POWER CONVERSION DEVICE, POWER CONVERSION SYSTEM, AND POWER CONVERSION METHOD

TECHNICAL FIELD

The present invention relates to a power conversion device that converts output of a distributed power source, a power conversion system, and a power conversion method.

BACKGROUND ART

In recent years, a distributed power source has been introduced among consumer's facilities of grid power. Examples of distributed power sources include a photovoltaic cell, a fuel cell, or a storage battery. Output power from these distributed power sources are DC/AC converted by a power conversion device to be supplied to a load. The power conversion device includes a DC/DC converter that boosts a voltage of DC power output by the distributed power source and a DC/AC converter that converts the DC power of which the voltage is boosted into AC power.

Further, a hybrid type power conversion device compatible with a plurality of distributed power sources is known. The hybrid type power conversion device includes a DC/DC converter specified by each distributed power source and a DC/AC converter (for example, in Patent Literature 1).

CITATION LIST

Patent Literature

Patent Literature 1: Japanese Application Publication No. 2012-228043

SUMMARY OF INVENTION

Incidentally, capacity of a power converter such as a DC/DC converter is generally selected in accordance with output of a corresponding distributed power source. However, some power conversion devices such as a hybrid type power conversion device include a plurality of converters, and higher efficiency is required in terms of cost and installation space.

Accordingly, an object of the present invention is to provide a power conversion device that utilizes a converter in high efficiency, a power conversion system, and a power conversion method.

A power conversion device according to the first aspect of the present invention converts output power from a plurality of distributed power sources or supply power to the plurality of distributed power sources. The power conversion device is provided with a plurality of converters that convert the output power or the supply power, each of the plurality of converters individually converts the output power from the plurality of distributed power sources or the supply power to the plurality of distributed power sources in a first state, and the plurality of converters convert output to or input from at least one distributed power source by using a plurality of converters in a second state.

In the first aspect, each of the plurality of converters is connected to each of the plurality of distributed power sources through a power line, a connecting line that connects power lines is included, and the power line and the connecting line are provided with a switching means that changes a path in the first state and the second state.

In the first aspect, a controller that gives instruction to perform switching by the switching means when switching between the first state and the second state is further included.

In the first aspect, the switching means is configured to include a plurality of switches, and when selecting the second state, the controller controls opening and closing of the switch so as to switch a connection destination of at least one converter from a distributed power source that is connected in the first state to another distributed power source.

In the first aspect, the controller selects the second state when there is an unused converter.

In the first aspect, the controller, in the second state, instructs a distributed power source specified from the plurality of distributed power sources to perform switching by the switching means so as to connect the unused converter, in addition to a converter that is connected to the distributed power source through the power line.

In the first aspect, the plurality of distributed power sources include a storage battery, and in the second state, the controller gives instruction to perform switching by the switching means so as to connect an unused converter, in addition to a converter that is connected to the storage battery through the power line, and charges the storage battery by inputting thereto power of other than that of the storage battery with the use of the both converters.

In the first aspect, the controller selects the second state in a predetermined time zone.

In the first aspect, capacity of each of the plurality of converters is smaller than maximum output power or maximum input power of the distributed power source connected thereto through the power line.

In the first aspect, each of the plurality of converters is a DC/DC converter, and the power conversion device further includes a DC/AC converter that converts DC power from each distributed power source converted by each DC/DC converter into AC power.

In the first aspect, each of the plurality of converters is a DC/DC converter, and the power conversion device further includes a DC/AC converter that converts AC power from a grid into DC power to be supplied to each DC/DC converter.

A power conversion system according to the second aspect of the present invention includes a power conversion device that converts output power from a plurality of distributed power sources or supply power to the plurality of distributed power sources, and a controller that controls the power conversion device. The power conversion device is provided with a plurality of converters that convert the output power or the supply power, each of the plurality of converters individually converts the output power from the plurality of distributed power sources or the supply power to the plurality of distributed power sources in a first state, the plurality of converters convert output to or input from at least one distributed power source by using a plurality of converters in a second state, and the control device selects either of the first state or the second state.

In the second aspect, when the plurality of distributed power sources include a storage battery-mounted vehicle, the control device selects the second state, and indicates, to the power conversion device, an unused converter in addition to a converter connected to the storage battery-mounted vehicle through a power line, and the power conversion device charges the storage battery-mounted vehicle by inputting thereto power of other than that of the storage battery-mounted vehicle with the use of the converter that is connected to the storage battery-mounted vehicle through the power line and the unused converter.

In the second aspect, the control device controls the power conversion device by using a communication protocol conforming to ECHONET Lite.

A power conversion method according to the third aspect of the present invention is a power conversion method in a power conversion device that converts output power from a plurality of distributed power sources or supply power to the plurality of distributed power sources. The power conversion device is provided with a plurality of converters that convert the output power or the supply power, and the method includes a step of individually converting, by each of the plurality of converters, the output power from the plurality of distributed power sources or the supply power to the plurality of distributed power sources in a first state, and a step of converting, by the plurality of converters, output to or input from at least one distributed power source by using the plurality of converters in a second state.

DESCRIPTION OF EMBODIMENTS

Figure 1:
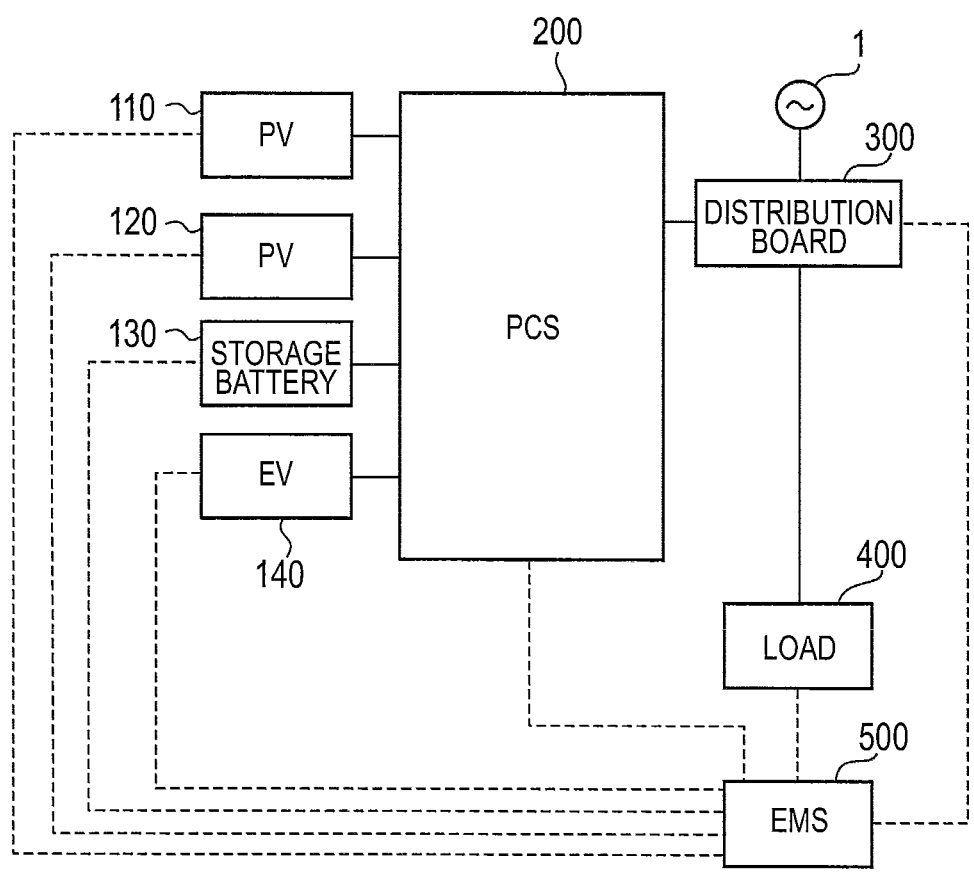
FIG. 1 is a diagram showing the entire configuration of a power conversion system according to a first embodiment of the present invention.

A power conversion device, a power conversion system, and a power conversion method according to an embodiment of the present invention will be described, below with reference to the accompanying drawings. In the following description of the drawings, the same or similar parts will be denoted by the same or similar reference numerals.

However, it should be noted that the drawings are schematically shown and the ratio and the like of each dimension are different from the real ones. Accordingly, specific dimensions, etc., should be determined in consideration of the explanation below. Further, it is needless to say that relations and ratios among the respective dimensions may differ among the diagrams.

[Overview of Embodiment]

A power conversion device according to an embodiment converts output power from a plurality of distributed power sources, or converts supply power to the plurality of distributed power sources. The power conversion device is provided with a plurality of converters that convert the output power or the supply power.

In the embodiment, each of the plurality of converters individually converts the output power from the plurality of distributed power sources or the supply power to the plurality of distributed power sources in a first state, and the plurality of converters convert output to or input from at least one distributed power source by using the plurality of converters in a second state. Consequently, it is possible to provide a power conversion device that utilizes a converter in high efficiency, a power conversion system, and a power conversion method.

[First Embodiment]

(1) Entire Configuration of Power Conversion System

FIG. 1 is a diagram showing the entire configuration of a power conversion system according to a first embodiment. In the following figure, a power line is shown by a solid line, and a signal line is shown by a broken line. The signal line may not just be wired but wireless.

As shown in FIG. 1, the power conversion system according to the first embodiment is provided with photovoltaic cells (PVs) 110 and 120, a storage battery 130, an electric vehicle (EV) 140, a power conditioner (PCS) 200, a distribution board 300, a load 400, and EMS 500, at the consumer's facility who receives supply of AC power from a grid 1.

Each of the PVs 110 and 120 is an example of a distributed power source, and is a solar light power generation device (PhotoVoltaic device) which generates power by receiving solar light. The PVs 110 and 120 output DC power generated thereby to the PCS 200. Each of the PVs 110 and 120 is configured by one panel or a plurality of panels. Further, the PVs 110 and 120 may be configured by using a plurality of strings configured by a plurality of panels.

The storage battery 130 is an example of the distributed power source and is a device that stores DC power. The storage battery 130 discharges the stored DC power and outputs the DC power to the PCS 200. Further, the storage battery 130 is charged with DC power supplied from the PCS 200.

The EV 140 is a storage battery-mounted vehicle driven by a storage battery, and regarded as one example of a storage battery in the system. The EV 140 is in common with the storage battery 130 in that the EV 140 is charged with the DC power supplied from the PCS 200. However, the EV 140 is different from the storage battery 130 in that the EV 140 is not always connected to the PCS 200, and consumes (discharges) stored DC power when the EV 140 is not connected to the PCS 200 (that is, during driving). The EV 140 is also capable of discharging DC power stored when the EV 140 is connected to the PCS 200 and outputting the DC power to the PCS 200.

The PCS 200 is an example of a power conversion device that converts output of a distributed power source. The PCS 200 converts DC power output by the PVs 110 and 120, the storage battery 130, and the EV 140 into AC power, and outputs the AC power to the distribution board 300, for example. The PCS 200 charges the storage battery 130 by supplying power supplied from the grid 1 to the storage battery 130 and the EV 140. Further, the PCS 200 is also capable of charging the storage battery 130 and the EV 140 by supplying output power from the PVs 110 and 120 to the storage battery 130 and the EV 140.

Thus, a PCS compatible with the plurality of distributed power sources (the PVs 110 and 120, the storage battery 130, and the EV 140) is also referred to as a hybrid PCS.

The distribution board 300 is a device that distributes power. The distribution board 300 is connected to the grid 1, the load 400, and the PCS 200 through a power line. If the AC power output by the PCS 200 is below power consumption of the load 400, the distribution board 300 receives a shortfall of the AC power from the grid 1, and supplies the load 400 with a combination of the AC power output by the PCS 200 and the AC power supplied from the grid 1.

The distribution board 300 may reversely flow (sell) AC power output by the PCS 200 to the grid 1. However, the AC power output by the PCS 200 sometimes includes output of a distributed power source from which reverse power flow is not allowed (for example, the storage battery 130 and the EV 140). In such a case, it should be noted that the PCS 200 reversely flows only output of a distributed power source from which the reverse power flow is allowed (for example, the PVs 110 and 120) to the distribution board 300.

The distribution board 300 is connected to the PCS 200 and the EMS 500 through a signal line, and performs communication by using a predetermined communication protocol such as ECHONET Lite or Zig Bee (registered trademark). The distribution board 300 transmits measured values of, for example, power that is supplied from the grid 1 or power that reversely flows to the grid 1, to the PCS 200 and the EMS 500.

The load 400 is a device that consumes AC power supplied through a power line. The load 400 includes a device such as lighting, an air conditioner, a refrigerator, and TV. The load 400 may be one device and include a plurality of devices.

The EMS 500 is an example of a control device, and is a device (Energy Management System) that controls the PCS 200, the distribution board 300, and the load 400. The EMS 500 is connected to the PCS 200, the distribution board 300, and the load 400 through a signal line. The EMS 500 controls the PCS 200, the distribution board 300, and the load 400 by using a signal conforming to the predetermined communication protocol such as the ECHONET Lite.

The EMS 500 may acquire measured values of the output of the PVs 110 and 120, power amount (amount of power to be stored) stored by the storage battery 130 and the EV 140, and power consumption of the load 400. The EMS 500 may acquire the measured values of the power that is supplied from the grid 1 or the power that reversely flows to the grid 1 from the distribution board 300, for example. Further, the EMS 500 may acquire the output of the PVs 110 and 120, charge and discharge power of the storage battery 130 and the EV 140, and an amount of power to be stored of the storage battery 130 and the EV 140, from the PCS 200. The EMS 500 may calculate predicted values of the output of the PVs 110 and 120, the amount of power to be stored of the storage battery 130 and the EV 140, and the power consumption of the load 400 on the basis of these measured values. Further, the EMS 500 may transmit these measured values to the PCS 200.

Further, the EMS 500 may be connected, through an external network, to various types of servers. The EMS 500 may acquire, from the various types of servers, information such as a purchase unit price of power supplied from the grid 1, and a sale unit price of power with respect to the grid 1.

(2) Basic Configuration of PCS

Figure 2:
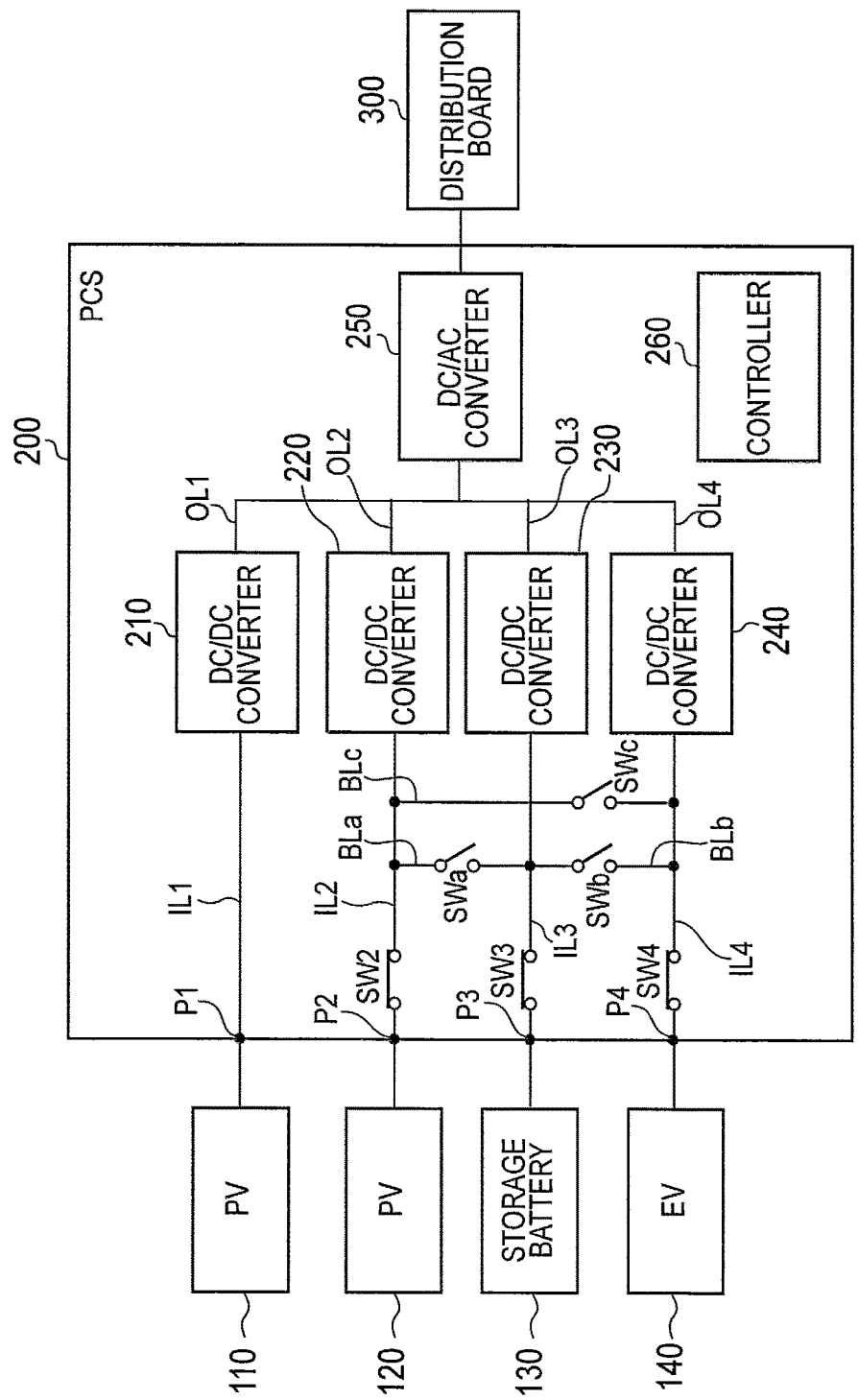
FIG. 2 is a diagram showing a basic configuration of a PCS according to the first embodiment of the present invention.

A basic configuration of the PCS 200 according to the first embodiment will be described, below. FIG. 2 is a diagram showing the basic configuration of the PCS 200.

As shown in FIG. 2, the PCS 200 according to the first embodiment includes DC/DC converters 210, 220, 230, and 240, a DC/AC converter 250, and a controller 260. Each of the DC/DC converters 210, 220, 230, and 240, and the DC/AC converter 250 is an example of a converter that performs power conversion.

The DC/DC converter 210 is connected to an input side power line IL1 that has a connection port P1 for the PV 110. Further, the DC/DC converter 210 is connected to the DC/AC converter 250 through an output side power line OL1. The DC/DC converter 210 boosts a voltage of the output power of the PV 110 that is input through the input side power line IL1, and outputs the output power to the output side power line OL1.

The DC/DC converter 220 is connected to an input side power line IL2 that has a connection port P2 for the PV 120. Further, the DC/DC converter 220 is connected to the DC/AC converter 250 through an output side power line OL2. The DC/DC converter 220 boosts the voltage of the output power of the PV 120 that is input through the input side power line IL2, and outputs the output power to the output side power line OL2.

The DC/DC converter 230 is a bidirectional DC/DC converter. The DC/DC converter 230 is connected to an input side power line IL3 that has a connection port P3 for the storage battery 130. Further, the DC/DC converter 230 is connected to the DC/AC converter 250 through an output side power line OL3.

The DC/DC converter 240 is connected to an input side power line IL4 that has a connection port P4 for the EV 140. Further, the DC/DC converter 240 is connected to the DC/AC converter 250 through an output side power line OL4. The DC/DC converter 240 boosts the voltage of the output power of the EV 140 that is input through the input side power line IL4, and outputs the output power to the output side power line OL4. Further, the DC/DC converter 240 lowers the voltage of the power that is input through the output side power line OL4, and outputs the power to the EV 140 through the input side power line IL4.

The DC/DC converter 240 is a bidirectional DC/DC converter compatible with the charge and discharge of the EV 140 in much the same way as in the DC/DC converter 230.

In the first embodiment, each of the input side power lines IL2, IL3, and IL4 is connected to the other input side power lines IL2, IL3, and IL4 through a connecting line that includes a switch. Specifically, the input side power line IL2 is connected to the input side power line IL3 through a connecting line BLa that includes a switch SWa. The input side power line IL3 is connected to the input side power line IL4 through a connecting line BLb that includes a switch SWb. The input side power line IL4 is connected to the input side power line IL2 through a connecting line BLc that includes a switch SWc.

Further, each of the input side power lines IL2, IL3, and IL4 includes switches SW2, SW3, and SW4, respectively, which are positioned nearer to the connection ports P2, P3, and P4 than the connection positions of the input side power lines IL2, IL3, and IL4 with the connecting lines. Each of the switches (the switches SWa, SWb, and SWc, as well as the switches SW2, SW3, and SW4) provided on the input side power lines and the connecting lines constitutes a switching means that changes a path from at least one distributed power source to a converter at a connection destination, as will be described below. Further, the DC/DC converter 220 is preferably a bidirectional DC/DC converter in much the same way as in the DC/DC converters 230 and 240.

The DC/AC converter 250 converts DC power that is input from the DC/DC converters 210, 220, 230, and 240 into AC power and outputs the AC power to the distribution board 300. Further, the DC/AC converter 250 converts AC power that is input from the distribution board 300 into DC power and outputs the DC power to the DC/DC converters 230 and 240, for example.

The controller 260 controls various types of functions of the PCS 200. Specifically, the controller 260 acquires information on a distributed power source that is connected to each of the connection ports P1, P2, P3, and P4. Further, the controller 260 acquires the measured values of the output of the PVs 110 and 120, as well as the measured values of the charge and discharge power and the amount of power to be stored of the storage battery 130 and the EV 140.

The controller 260 transmits and receives a signal in a format specified by the predetermined communication protocol such as the ECHONET Lite, to and from the EMS 500. The controller 260 may transmit acquired various types of measured values to the EMS 500. Further, a user interface unit that receives an input from a user may be connected to the controller 260.

(3) Operation of PCS

An operation of the PCS 200 will be described, below. In the first embodiment, each of a plurality of converters individually converts the input to and the output from the plurality of distributed power sources in a first state, and converts the input to and the output from at least one distributed power source by using a plurality of converters in a second state.

Here, it should be noted that, for the "plurality of distributed power sources" and a "plurality of DC/DC converters", a power line that connects each of these is connected to another power line through a connecting line that includes a switch. That is, among the distributed power sources shown in FIG. 2, the PV 120, the storage battery 130, and the EV 140 correspond to the "plurality of distributed power sources", among the DC/DC converters shown in FIG. 2, the DC/DC converters 220, 230, and 240 correspond to the "plurality of DC/DC converters", and the first state or the second state is applied thereto. On the other hand, in this example, the first state or the second state is not applied to the PV 110 and the DC/DC converter 210 shown in FIG. 2, and it is assumed that power is always transmitted between them.

In the first embodiment, the controller 260 gives instruction to perform switching by the switching means when switching between the first state and the second state. As described above, the switching means is configured to include the plurality of switches (the switches SWa, SWb, and SWc, as well as the switches SW2, SW3, and SW4). The first state and the second state will be described, below.

(3.1) First State

Firstly, a configuration of the PCS 200 in the first state will be described. In the first state, the PCS 200 operates in the configuration shown in FIG. 2. Specifically, when selecting the first state, the controller 260 turns on the switches SW2, SW3, and SW4, and turns off the switches SWa and SWb. Accordingly, in the first state, each distributed power source is in one-to-one correspondence with a DC/DC converter connected thereto through an input side power line, and power is transmitted between each distributed power source and one DC/DC converter corresponding thereto.

(3.2) Second State

Figure 3:
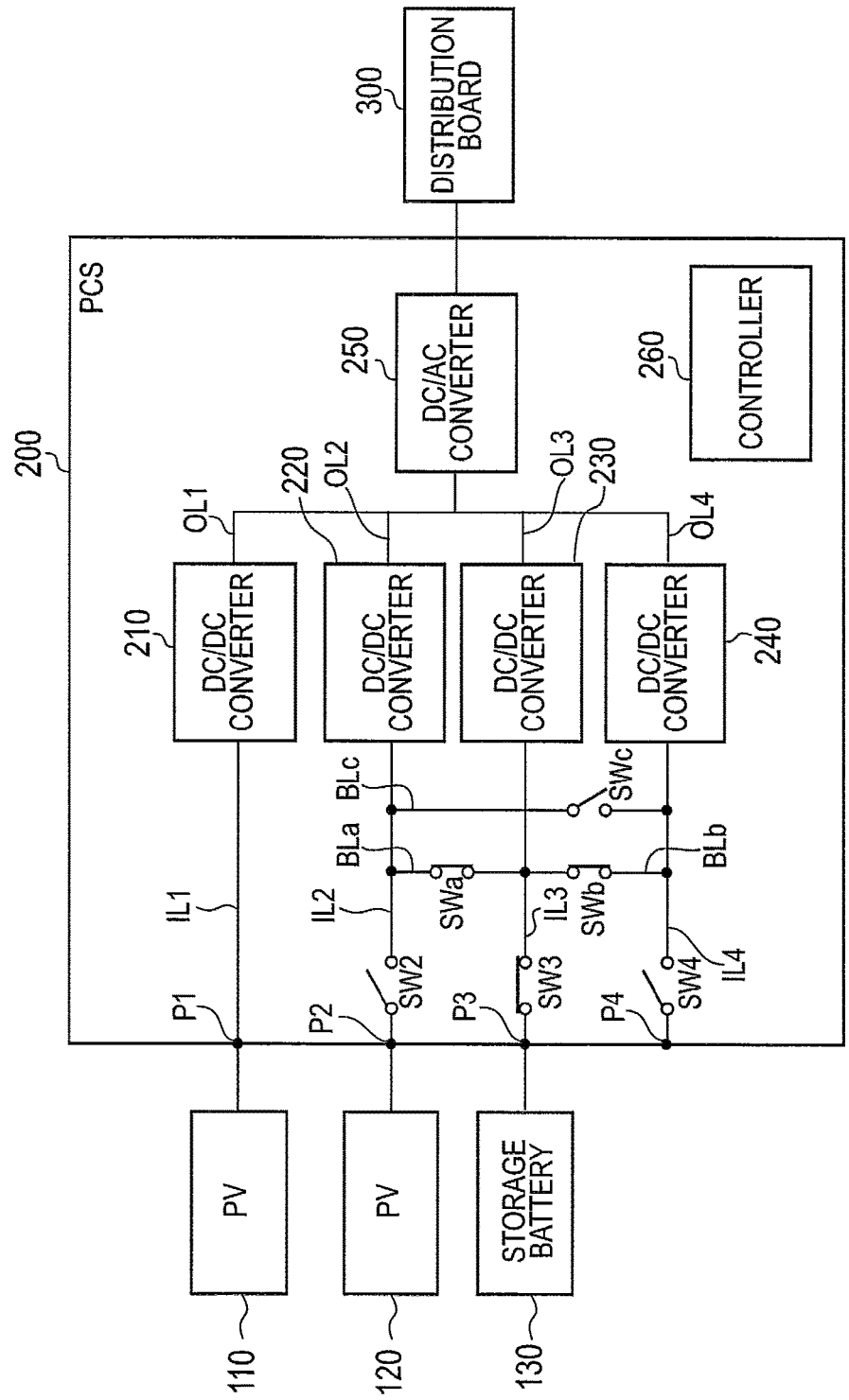
FIG. 3 is a diagram showing a configuration of the PCS in a second state according to the first embodiment of the present invention.

Next, a configuration of the PCS 200 in the second state will be described. FIG. 3 is a diagram showing the configuration of the PCS 200 in the second state. Here, all of the DC/DC converters 220, 230, and 240 are assumed to be bidirectional DC/DC converters.

In the first embodiment, when selecting the second state, the controller 260 controls opening and closing of a switch so as to switch a connection destination of at least one converter from a distributed power source that is connected in the first state to another distributed power source. For example, in a case shown in FIG. 3, the controller 260 switches a connection destination of the DC/DC converter 240 from the EV 140 that is connected in the first state to the storage battery 130, and switches the connection destination of the DC/DC converter 220 from the PV 120 that is connected in the first state to the storage battery 130. Then, the controller 260 turns on the switches SW3, SWa, and SWb positioned between the storage battery 130 and the DC/DC converters 220, 230, and 240, and turns off the switches SW2, SW4, and SWc. Consequently, the PCS 200 converts the output of the storage battery 130 by using the DC/DC converters 220, 230, and 240.

(3.3) Application Scene of Second State

An example of an application scene of the second state will be described, below.

(3.3.1) Discharge of storage battery using non-used DC/DC Converter

Firstly, an example of selecting the second state when there is an unused DC/DC converter, will be described. In the first embodiment, the controller 260 selects the second state when there is an unused converter. In the second state, the controller 260 instructs a distributed power source specified from among the plurality of distributed power sources to perform switching by the switching means so as to connect the unused converter, in addition to a converter that is connected to the distributed power source through an input side power line.

Specifically, as shown in FIG. 3, when the EV 140 is not connected to the connection port P4 (in other words, the EV is going out), the DC/DC converter 240 is not used. Then, for the storage battery 130, the controller 260 turns on the switch SWb and turns off the switch SW4 so as to connect the unused DC/DC converter 240 in addition to the DC/DC converter 230 that is connected to the storage battery 130 through the input side power line IL3.

Here, in this example, the capacity of each of the plurality of DC/DC converters is smaller than maximum output power or maximum input power of the distributed power source connected thereto through the power line. However, in the second state, the total capacity of the plurality of DC/DC converters to be used for the output conversion of at least one distributed power source may be equal to or more than the maximum output power or the maximum input power of the one distributed power source. Consequently, as described above, the case in which two DC/DC converters 230 and 240 are used for the output conversion of the storage battery 130 enables the storage battery 130 to discharge at the maximum output or charge at the maximum input.

Further, in the case of FIG. 3, also being the case in which there is no output of the PV 120 at nighttime or in bad weather, for example, the DC/DC converter 220 that is rarely used as an example in this case, is connected to the storage battery 130. This connection state will be described next.

(3.3.2) Charge of Storage Battery Using Non-Used DC/DC Converter

Next, an example of selecting the second state in a predetermined time zone and charging a storage battery, will be described. In the first embodiment, when the plurality of distributed power sources include the storage battery, in the second state, the controller 260 gives instruction to perform switching by the switching means so as to connect another converter, in addition to the converter that is connected to the storage battery through the input side power line, and charges the storage battery by inputting thereto power of other than that of the storage battery with the use of the both converters.

Specifically, the controller 260 selects the second state in the predetermined time zone. Here, the predetermined time zone is, for example, a midnight time zone during which the purchase unit price of power from the grid 1 is low. Further, the operation of the PV 120 is stopped during the midnight time zone, and thus the DC/DC converter 220 is not used in the case of the first state. Then, the DC/DC converter 220 is used for the storage battery 130.

The controller 260 instructs the storage battery 130 to perform switching by the switching means so as to connect the unused DC/DC converter 220 in addition to the DC/DC converter 230. That is, the controller 260 turns on the switch SWa while turning off the switch SW2, and charges the storage battery 130 by using the DC/DC converters 220 and 230. Consequently, it becomes possible to sufficiently secure charging power for the storage battery 130.

Here, when the EV 140 is not connected to the connection port P4 and the DC/DC converter 240 is not used in the predetermined time zone, the controller 260 is also capable of giving instruction to perform switching by the switching means so as to further connect the DC/DC converter 240. Further, needless to say, when the EV 140 is connected to the connection port P4 in the predetermined time zone, the controller 260 may instruct the EV 140 to perform switching by the switching means so as to connect the unused DC/DC converter 220 in addition to the DC/DC converter 240, and charge the EV 140. Consequently, it becomes possible to sufficiently secure charging power for the EV 140

(4) Power Conversion Method

Figure 4:
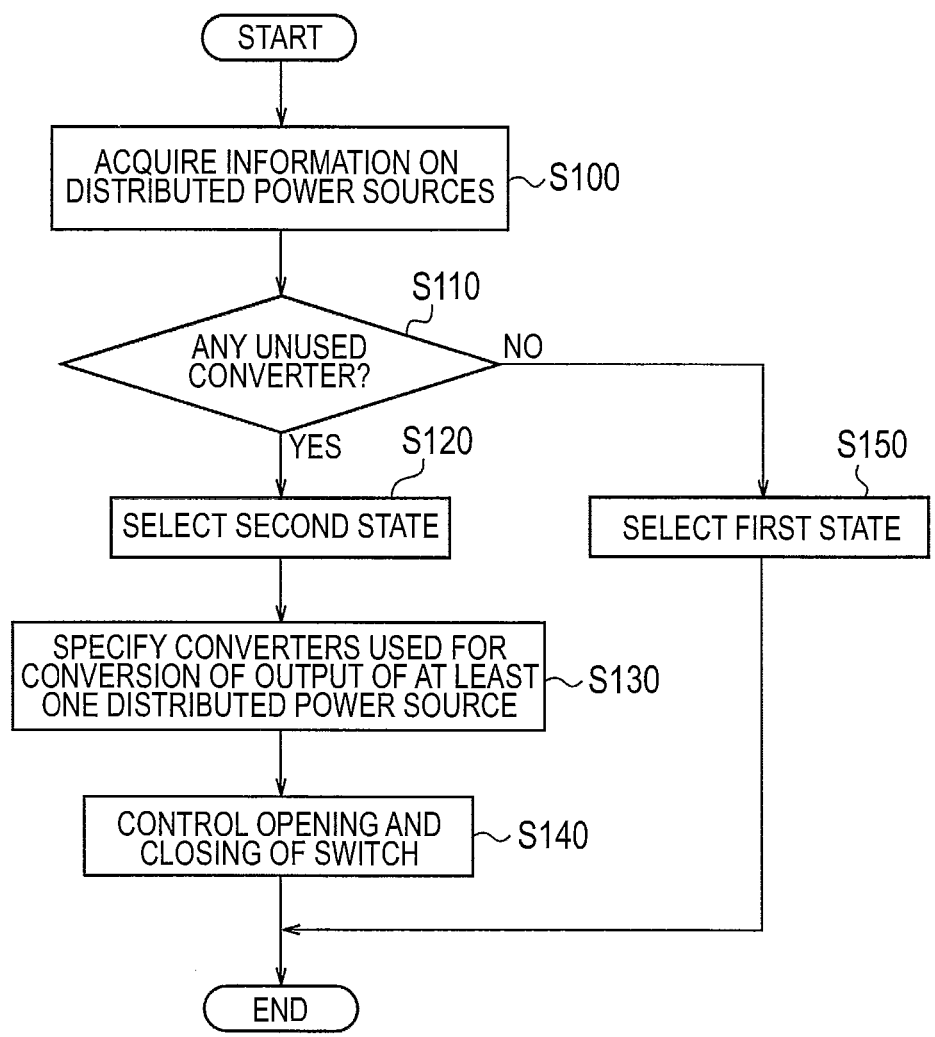
FIG. 4 is a flow diagram showing a power conversion method according to the first embodiment of the present invention.
Figure 5:
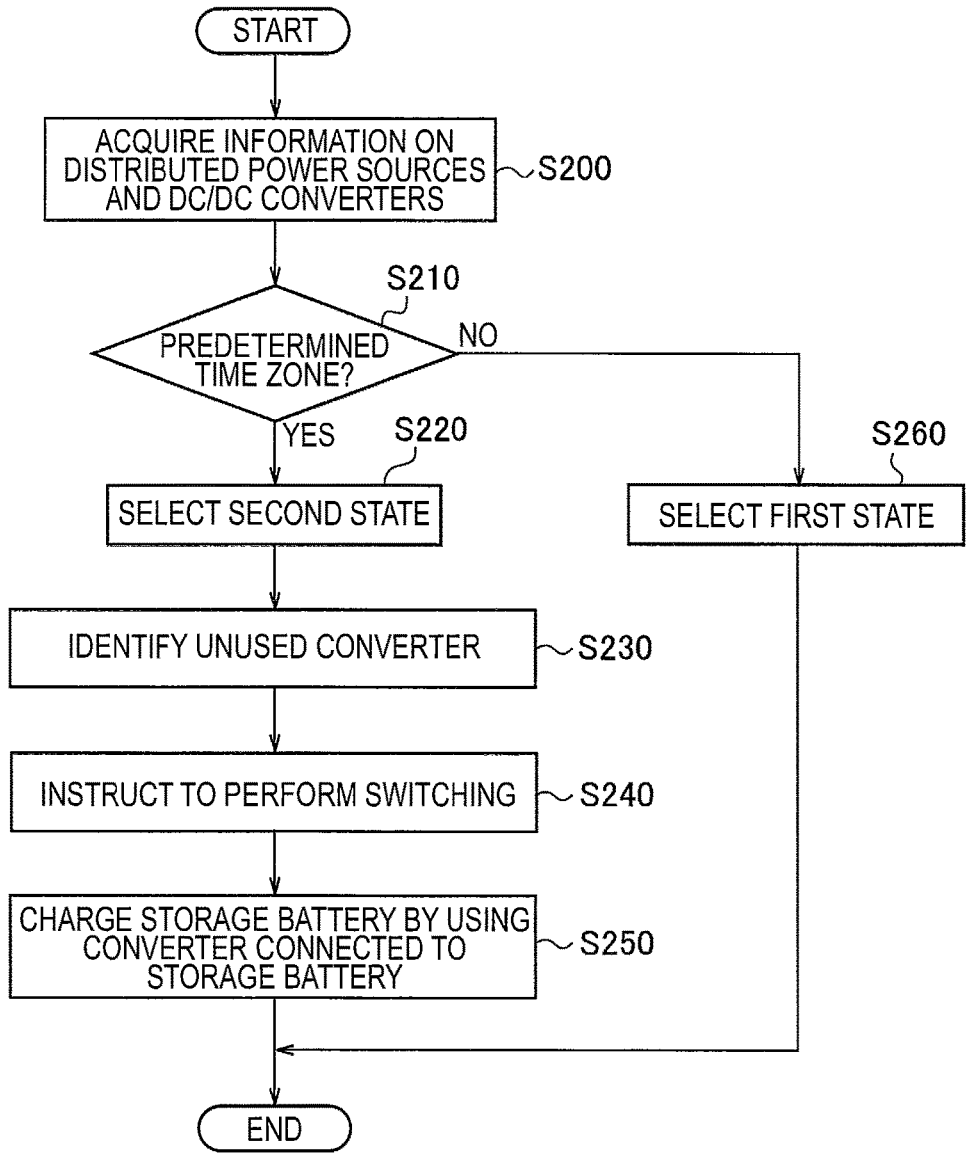
FIG. 5 is a flow diagram showing the power conversion method according to the first embodiment of the present invention.

The power conversion method according to the first embodiment of the present invention will be described, below. FIG. 4 and FIG. 5 are flow diagrams showing a power conversion method according to the first embodiment of the present invention.

Firstly, with reference to FIG. 4, a flow for an example of selecting the second state when there is an unused DC/DC converter, will be described. In step S100, the PCS 200 acquires information on the distributed power source that is connected to each of the connection ports P1, P2, P3, and P4. As described above, the PV 120, the storage battery 130, and the EV 140 connected to the connection ports P2, P3, and P4 are distributed power sources to which the second state is applicable.

In step S110, the PCS 200 determines whether or not there is an unused DC/DC converter. When the determination result is YES, the PCS 200 proceeds to processing in step S120. When the determination result is NO, the PCS 200 proceeds to processing in step S150 and operates in the first state.

In step S120, the PCS 200 selects the second state.

In step S130, the PCS 200 specifies a plurality of converters to be used for conversion of the output of at least one distributed power source.

In step S140, the PCS 200 controls opening and closing of a switch so as to switch a connection destination of at least one converter from a distributed power source that is connected in the first state to another distributed power source.

Next, with reference to FIG. 5, a flow diagram for an example of selecting the second state in a predetermined time zone and charging the storage battery, is shown. In step S200, the PCS 200 acquires information on the distributed power source that is connected to each of the connection ports P1, P2, P3, and P4. As described above, the PV 120, the storage battery 130, and the EV 140 connected to the connection ports P2, P3, and P4 are distributed power sources to which the second state is applicable.

In step S210, the PCS 200 determines whether or not the current time is the predetermined time zone. When the determination result is YES, the PCS 200 proceeds to processing in step S220. When the determination result is NO, the PCS 200 proceeds to processing in step S260, and operates in the first state.

In step S220, the PCS 200 selects the second state.

In step S230, the PCS 200 identifies an unused converter. Here, the DC/DC converter 220 is assumed to be identified as the unused converter.

In step S240, the PCS 200 instructs the storage battery 130 to perform the switching so as to connect the DC/DC converter 220 in addition to the DC/DC converter 230.

In step S250, the PCS 200 charges the storage battery 130 by using the DC/DC converters 220 and 230 connected to the storage battery 130.

As described above, in the first embodiment, in addition to the first state of performing conversion by using one converter for the output of one distributed power source, the second state of performing conversion by using a plurality of converters for the output of at least one distributed power source, is provided. In other words, by utilizing a converter in high efficiency, it is possible to curb increase in the capacity of the converter and realize cost reduction and space saving.

Incidentally, in the first embodiment, a so-called configuration with software is shown in which when the controller 260 determines that the DC/DC converter 240 is not used, the DC/DC converter 240 is specified as a DC/DC converter corresponding to the storage battery 130 in addition to the DC/DC converter 230. However, similar control may be configured with hardware, not software. That is, when it is detected that, for example, the DC/DC converter 240 is not used by using a comparator or the like (power that is input/output is less than a predetermined value), a logic circuit that performs switching by a switch so as to forcibly connect the DC/DC converter 240 as a DC/DC converter corresponding to the storage battery 130, may be configured.

[Second Embodiment]

Figure 6:
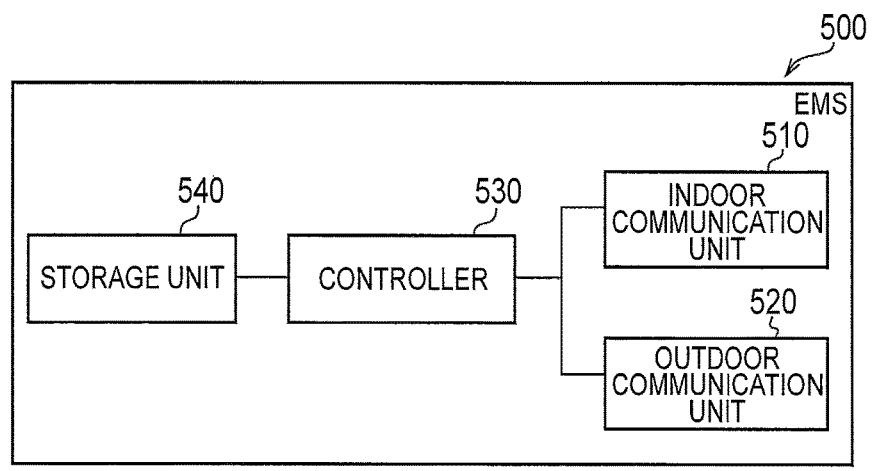
FIG. 6 is a block diagram of EMS according to a second embodiment of the present invention.

A power conversion system according to a second embodiment of the present invention will be described, below. FIG. 6 is a block diagram of EMS 500 according to the second embodiment of the present invention. Mainly, differences from the first embodiment are mainly described, below.

As shown in FIG. 6, the EMS 500 has an indoor communication unit 510, an outdoor communication unit 520, a controller 530, and a storage unit 540.

The indoor communication unit 510 transmits and receives various types of signals to and from a device that is compatible with near field communication such as WiFi and connected to the indoor communication unit 510 through a signal line. For example, the indoor communication unit 510 receives information on a device type, power consumption, and the like of the load 400.

In the second embodiment, the indoor communication unit 510 receives various types of information on the PVs 110 and 120, the storage battery 130, and the EV 140 (hereinafter referred to as distributed power source information) through a signal line. The distributed power source information includes, for example, the device type, a device ID, rated output, or a connection port number of the PCS 200 connected. The distributed power source information is transmitted to the indoor communication unit 510, in a format specified by the predetermined protocol of the ECHONET Lite, for example. The indoor communication unit 510 may receive the distributed power source information from the PCS 200 (the controller 260).

In the second embodiment, the indoor communication unit 510 receives various types of information on the DC/DC converters 210, 220, 230, and 240 (hereinafter referred to as DC/DC converter information) from the PCS 200 through a signal line. The DC/DC converter information includes, for example, the capacity, and presence or absence of a connecting line connected to an input side power line. The DC/DC converter information is transmitted to the indoor communication unit 510, in a format specified by the predetermined protocol of the ECHONET Lite, for example.

The outdoor communication unit 520 is compatible with a public communication system such as Ethernet (registered trademark), and communicates with an external server, for example.

The controller 530 controls the operation of the EMS 500. Further, the controller 530 generates a command in the format specified by the predetermined protocol such as the ECHONET Lite, transmits the command to the PCS 200 and the load 400 through the indoor communication unit 510, and thereby controls the PCS 200 and the load 400.

The storage unit 540 stores information necessary for the controller 530 to control the PCS 200 and the load 400. Specifically, the storage unit 540 stores the distributed power source information and the DC/DC converter information.

In the second embodiment, each of a plurality of converters individually converts the output of the plurality of distributed power sources in the first state, and converts the output of at least one distributed power source by using a plurality of converters in the second state. The EMS 500 (the controller 530) selects either of the first state or the second state.

Specifically, in the second state, the EMS 500 (the controller 530) is connected to one distributed power source specified from among a plurality of distributed power sources, by further specifying at least one DC/DC converter from among a plurality of DC/DC converters in addition to a DC/DC converter that is connected to the distributed power source through a power line. The PCS 200 controls a switch in accordance with a power transmission path between the specified distributed power source, and the DC/DC converter connected through the power line and the specified DC/DC converter.

In other words, in the second embodiment, the EMS 500 (the controller 530) performs the selection of the first state or the second state, and the specification of the DC/DC converter to be used for the output conversion of the distributed power source specified in the second state, which are performed by the PCS 200 (the controller 260) in the first embodiment. The EMS 500 selects the first state or the second state on the basis of acquired distributed power source information and DC/DC converter information, as well as the measured values of output power or input power of the distributed power source. In the second state, the EMS 500 (the controller 530) transmits information on the specified distributed power source and the specified DC/DC converter to the PCS 200 (the controller 260), and instructs the PCS 200 (the controller 260) to control a switch in accordance with a power transmission path between the specified distributed power source and the specified DC/DC converter.

In the second embodiment, when the plurality of distributed power sources include the EV 140, the EMS 500 (the controller 530) selects the second state, and indicates an unused converter to the PCS 200 (the controller 260), in addition to a converter that is connected to the EV 140 through a power line. The PCS 200 (the controller 260) charges the EV 140 by inputting thereto power other than that of the EV 140 with the use of the converter that is connected to the EV 140 through the power line and the unused converter.

Specifically, the EMS 500 determines whether or not the EV 140 is connected to the power line when the plurality of distributed power sources include the EV 140. When determining that the EV 140 is connected to the power line, the EMS 500, while selecting the second state, specifies two or more DC/DC converters corresponding to the EV 140 and indicates the DC/DC converters to the PCS 200 (the controller 260). For example, when the DC/DC converter 220 is not used, the PCS 200 turns on the switch SWc while turning off the switch SW2, and charges the EV 140 by inputting thereto the power other than that of the EV 140 with the use of the DC/DC converters 220 and 240.

The EMS 500 is capable of distinguishing between the EV 140 and the storage battery 130 with the device type included in the distributed power source information. Being different from the storage battery 130, the EV 140 discharges when the EV 140 is not connected to the PCS 200, and thus at the time point when connected to the PCS 200, the EV 140 needs to be charged more preferentially than the storage battery 130. Accordingly, when determining that the EV 140 is connected to the connection port P4, the EMS 500 selects the second state. The EMS 500 notifies the PCS 200 that the EV 140 is connected, and specifies two or more DC/DC converters corresponding to the EV 140. Here, in much the same way as in the first embodiment, the EMS 500 preferably specifies an unused DC/DC converter. However, when there is no unused DC/DC converter, for example, the operation of the storage battery 130 is stopped, the DC/DC converter 230 is specified, and the EV 140 is charged preferentially.

Figure 7:
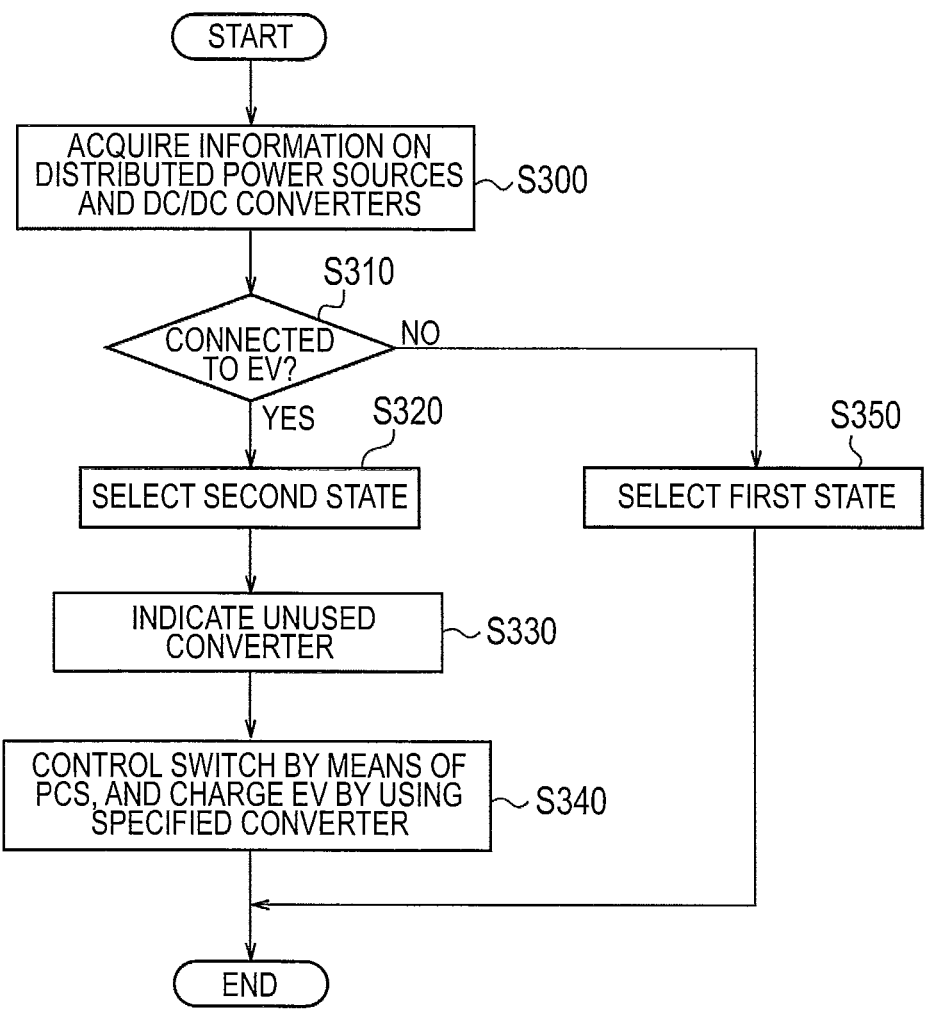
FIG. 7 is a flow diagram showing a power conversion method according to the second embodiment of the present invention.

A power conversion method according to the second embodiment of the present invention will be described, below. FIG. 7 is a flow diagram showing the power conversion method according to the second embodiment of the present invention.

In step S300, the EMS 500 acquires the distributed power source information and the DC/DC converter information. As described above, the PV 120, the storage battery 130, and the EV 140 connected to the connection ports P2, P3, and P4 are distributed power sources to which the second state is applicable.

In step S310, the EMS 500 determines whether or not the EV 140 is connected to the PCS 200 (the connection port P4). When the determination result is YES, the PCS 200 proceeds to processing in step S320. When the determination result is NO, the PCS 200 proceeds to processing in step S350, and operates in the first state.

In step S320, the EMS 500 selects the second state.

In step S330, the EMS 500 indicates an unused converter to the PCS 200 in addition to a converter that is connected to the EV 140 through a power line. Here, the DC/DC converter 220 is assumed to be indicated as the unused converter.

In step S340, the PCS 200 controls a switch in accordance with a power transmission path between the EV 140 and specified DC/DC converter. Consequently, the EMS 500 charges the EV 140 by inputting thereto power other than that of the EV 140 with the use of the DC/DC converters 220 and 240.

[Other Embodiments]

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

The EMS 500 may be HEMS (Home Energy Management System), may be SEMS (Store Energy Management System), may be BEMS (Building Energy Management System), may be FEMS (Factory Energy Management System), and may be MEMS (Mansion Energy Management System).

In the above-described embodiment, each of the PVs 110 and 120 has been described as one example of a power generation device. However, the power conversion system may include a fuel cell such as SOFC (Solid Oxide Fuel Cell) or PEFC (Polymer Electrolyte Fuel Cell), as a power generation device in place of the PVs 110 and 120. Alternatively, the power conversion system may further include a fuel cell as a power generation device in addition to the PVs 110 and 120.

Further, in the above-described embodiment, the DC/DC converter as an object to switch a corresponding relation between the first state and the second state has been described as one example of a converter that performs power conversion, however, the converter is not limited to the DC/DC converter. That is, needless to say, the converter may be a DC/AC converter or an AC/DC converter.

In addition, the entire content of Japanese Patent Application No. 2013-142466 (filed on Jul. 8, 2013) is incorporated in the present application by reference.

INDUSTRIAL APPLICABILITY

According to the present invention, it is possible to provide a power conversion device that utilizes a converter in high efficiency, a power conversion system, and a power conversion method.

The invention claimed is:

1. A power conversion device that converts output power from a plurality of distributed power sources or supplies power to the plurality of distributed power sources, comprising:
a plurality of converters configured to convert the output power or the supply power, and
a controller configured to control connections of the plurality of converters, wherein
the plurality of converters includes a first converter connected to a first distributed power source outputs a generated power and a second converter connected to a second distributed power source performs a charge or discharge,
the controller connects the first converter with the first distributed power source and connects the second converter with the second distributed power source in a first state applied for a time period where the first distributed power source outputs the generated power, and
the controller connects the first converter and the second converter with the second distributed power source in a second state applied for a time period where the first distributed power source does not output the generated power.

2. The power conversion device according to claim 1, wherein
a maximum output power or maximum input power of the second distributed power source is larger than a capacity of the first converter and a capacity of the second converter.

3. The power conversion device according to claim 1, wherein
the first converter and the second converter are DC/DC converters,
the power conversion device further comprising:
a DC/AC converter that converts DC power into AC power.

4. The power conversion device according to claim 1, wherein
the first converter and the second converter are DC/DC converters,
the power conversion device further comprising:
a DC/AC converter that converts AC power into DC power.

5. The power conversion device according to claim 1, wherein
the first converter is a bidirectional converter enable to convert the output power from the second distributed power source and the supplied power to the second distributed power source.

6. The power conversion device according to claim 1, wherein
the first distributed power source is any one of a photovoltaic cell device and a fuel cell device.

7. A power conversion system, comprising:
a power conversion device that converts output power from a plurality of distributed power sources or supplies power to the plurality of distributed power sources; and
a control device that controls the power conversion device, wherein
the plurality of converters includes a first converter connected to a first distributed power source outputs a generated power and a second converter connected to a second distributed power source performs a charge or discharge,
the power conversion device connects the first converter with the first distributed power source and connects the second converter with the second distributed power source in a first state applied for a time period where the first distributed power source outputs the generated power, and
the power conversion device connects the first converter and the second converter with the second distributed power source in a second state applied for a time period where the first distributed power source does not output the generated power, and
the control device selects either of the first state or the second state.

8. The power conversion system according to claim 7, wherein
the control device controls the power conversion device by using a communication protocol conforming to ECHONET Lite.

9. A power conversion method in a power conversion device that converts output power from a plurality of distributed power sources or supplies power to the plurality of distributed power sources, wherein
the power conversion device is provided with a plurality of converters that convert the output power or the supply power, and
the plurality of converters includes a first converter connected to a first distributed power source outputs a generated power and a second converter connected to a second distributed power source performs a charge or discharge,
the power conversion method comprising:
connecting the first converter with the first distributed power source and connecting the second converter with the second distributed power source in a first state applied for a time period where the first distributed power source outputs the generated power, and
connecting the first converter and the second converter with the second distributed power source in a second state applied for a time period where the first distributed power source does not output the generated power.

\* \* \* \* \*